(12) United States Patent
Grund et al.

(10) Patent No.: US 6,749,495 B2
(45) Date of Patent: Jun. 15, 2004

(54) MACHINE TOOL WITH ROOF COVERING BELLOW

(75) Inventors: Peter Grund, Trossingen (DE); Siegfried Schmid, Göppingen (DE); Pavel Blazek, Albershausen (DE); Walter Niederberger, Schlierbach (DE)

(73) Assignee: Stama Maschinenfabrik GmbH, Schlierbach (DE)

( * ) Notice: Subject to any disclaimer, the term of this patent is extended or adjusted under 35 U.S.C. 154(b) by 223 days.

(21) Appl. No.: 09/915,003

(22) Filed: Jul. 25, 2001

(65) Prior Publication Data
US 2002/0077052 A1 Jun. 20, 2002

Related U.S. Application Data

(63) Continuation of application No. PCT/EP00/08481, filed on Aug. 31, 2000.

(30) Foreign Application Priority Data

Nov. 26, 1999 (DE) .......................................... 199 56 900

(51) Int. Cl.$^7$ ............................................... B24B 55/04
(52) U.S. Cl. ...................... 451/451; 451/455; 451/457
(58) Field of Search .................................. 451/451, 452, 451/454, 455, 457

(56) References Cited

U.S. PATENT DOCUMENTS 3,824,890 A * 7/1974 Zettler et al. ............... 409/134
4,551,953 A * 11/1985 Lewandowski ............. 451/451
4,882,881 A   11/1989 VanKuiken, Jr. et al. ..... 51/426
5,449,256 A * 9/1995 Sundman .................... 409/134
5,897,430 A   4/1999 Haller ........................ 451/451

FOREIGN PATENT DOCUMENTS

| DE | 1 121 967 | 1/1962 |
| DE | 34 11 394 | 10/1985 |
| DE | 3532702 A1 * | 3/1987 |
| DE | 3613520 A1 * | 10/1987 |
| DE | 3731770 A1 * | 3/1989 |
| DE | 41 17 699 | 12/1992 |
| DE | 43 09 719 | 9/1994 |
| GB | 644843 | 10/1950 |
| JP | 2002-137143 A * | 5/2002 |
| JP | 2002-283179 A * | 10/2002 |

* cited by examiner

*Primary Examiner*—M. Rachuba
(74) *Attorney, Agent, or Firm*—Weingarten, Schurgin, Gagnebin & Lebovici LLP

(57) ABSTRACT

A machine tool comprises a working area, closed by walls and a roof covering, in which a device for receiving a work piece is arranged, and a headstock with a main spindle is arranged, into which tools for machining the work piece can be clamped. Device and headstock are movable relatively to each other. In a front wall an opening lockable by a door leads into the working area. At least one part of the roof covering is movable between two positions in such a way that it locks the working area to the top in a first position and releases same to the top for loading in a second position.

17 Claims, 6 Drawing Sheets

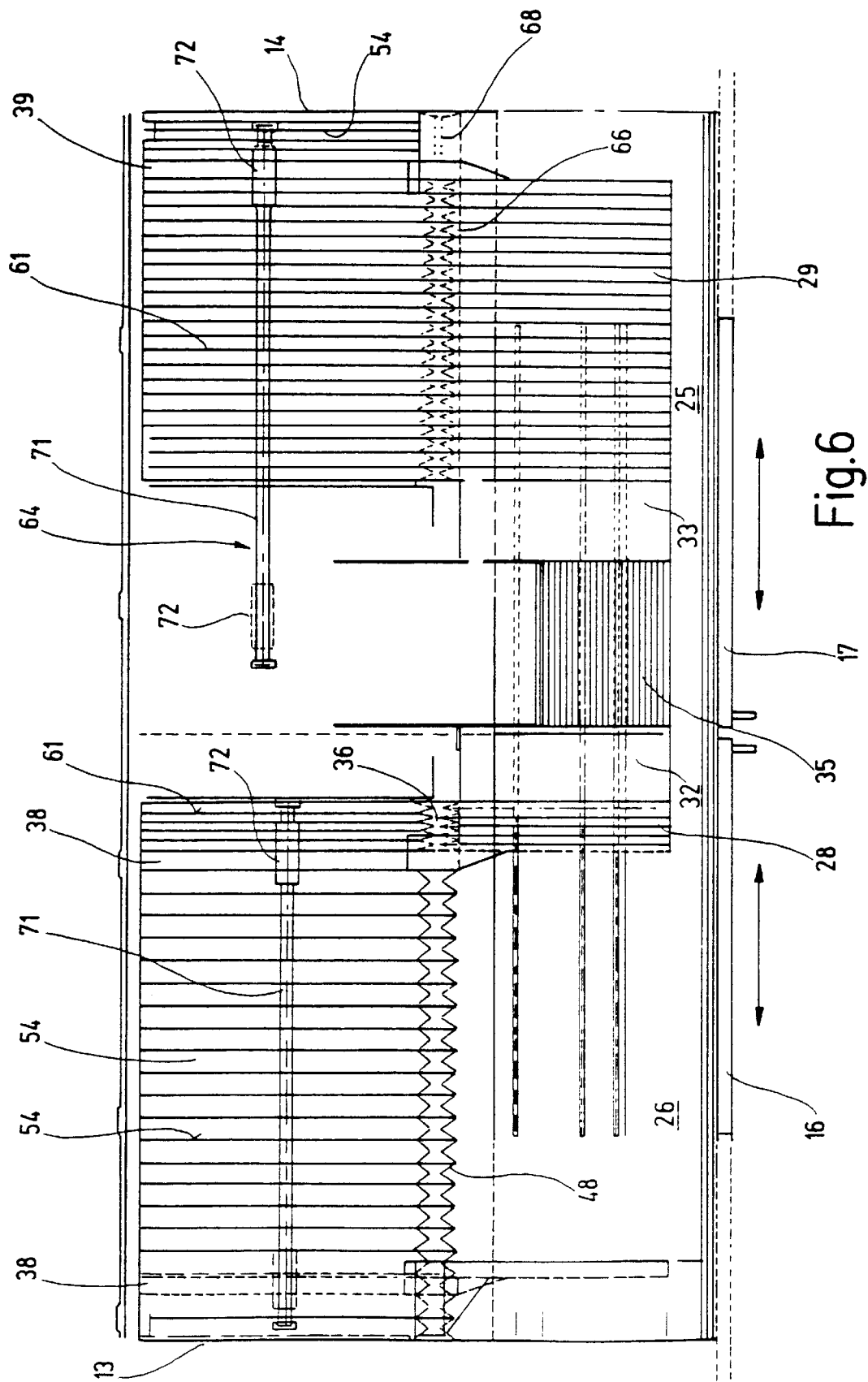

MACHINE TOOL WITH ROOF COVERING BELLOW

RELATED APPLICATION

This application is a continuation application of International Patent Application PCT/EP00/08481 filed Aug. 31, 2000.

BACKGROUND OF THE INVENTION

1. Field of the Invention

The present invention relates to a machine tool with a working area closed by walls and a roof covering, in which working area a device for receiving a work piece and a headstock with a main spindle are arranged, into which main spindle tools for machining the work piece can be clamped, whereby the device and the headstock are movable relatively to each other, and whereby in a front wall an opening to be closed by a door leads into the working area.

2. Related Prior Art

Such machine tools are known from the prior art.

In known machine tools, a housing is provided, which completely surrounds the working area and the headstock, the housing being further divided by inner walls, so that the working area is closed towards the guide rails and other equipments of the machine tool. This closed working area ensures that chips arising from machining the work pieces and used coolant do not result in contamination of the ambient and e.g. of the guideways, which would be disadvantageous for obvious reasons. In the working area, a device for receiving the work pieces to be machined is provided, whereby, further, the headstock projects, at least with its spindle head carrying the main spindle, into the working area, so that the tools clamped in the main spindle can be used for machining the work piece.

For the exchange of the work piece, the door provided in the front wall of the housing is opened, whereupon the work piece is first of all sprayed off/rinsed off by means of compressed air or a cleaning liquid, before it is then taken off. After that, the device is cleaned by means of compressed air or cleaning liquid, before a new work piece is clamped into the device, the door is closed and the machining is continued.

In such machine tools, it is further known to divide the working area into a loading side and a machining side, and to provide a partition wall between the loading side and the machining side in such a way that, during the machining of a work piece on one side, a readily machineed work piece can be exchanged against a new work piece to be machineed on the other side. The loading side and the machining side can be, in this procedure, exchanged in the rhythm of the work piece machining.

It is known for machine tools with closed working area to configure the rear wall of the working area by a bellow, which is fixed with its one end at a side wall of the housing and with its other end at the headstock. In this way, the bellow is shortened or lengthened in x-direction. Usually, on both sides of the headstock, there are two bellows, which, correspondingly, lengthen and/or shorten in opposite direction, if the headstock is moved in x-direction.

It is also known to configure the roof covering by such bellows, which are arranged between the respective side wall and the assigned side of the headstock. It is further known to arrange a bellow extending in y-direction between the face of the headstock and the front wall of the housing, whereby this bellow is lengthened or shortened in y-direction, if the headstock is moved.

All these machine tools have the disadvantage that only devices and work pieces with certain dimensions can be loaded and discharged through the opening provided in the front wall, a crane loading of very bulky and/or very heavy work pieces and/or devices is only possible by using a U-shaped fork laterally engaging through the opening into the working area. Such a loading is, however, disadvantageous both of static reasons and of handling reasons.

To remedy this problem, it is already known for fully enclosed machine tools to extend the door in the front side of the housing to the top and to extend the door to the rear over the roof area, so that a door is created, which is angle-shaped in the cross section, and, when being moved, releases a loading opening, which releases the working area both to the front and to the top. For such a door with a "roof section", consequently, also a crane loading from the top is possible.

Such machine tools have the disadvantage, however, that the door is very heavy and very large, so that it is large-scale in design, and the guidings have to be configured correspondingly. This results not only in very expensive and awkward designs, the whole construction height of the machine tool is, moreover, very large, as the door has to extend up to over the height of the headstock. A further disadvantage in such machine tools is that such a large door is only with high effort configurable in such a way that it provides, in a closed state, for a safe sealing of the working area to the outside.

A further disadvantage in such machine tools is to be seen in the fact that heat accumulation arises in the working area. The heat arising from the operation of the motors, e.g. for the moving of the headstock or the drive of the main spindle, heats up the working area and, thus, influences negatively the thermal stability of the machine tool.

SUMMARY OF THE INVENTION

In view of the above, it is an object of the present invention to allow a simple loading from the top of the known machine tool in a design constructively as simple as possible, by reducing the disadvantages from the prior art.

In the machine tool mentioned at the outset, this object is essentially achieved, according to the invention, in that at least a part of the roof covering is movable between two positions in such a way that it closes the working area to the top in a first position, and in a second position opens the working area to the top for loading.

In this way, it is now possible, additionally to the opening lockable by the door, to alternatively release a large loading opening, which is accessible from the top and through which a crane loading of even largest and heaviest parts is possible. The inventors of the present invention have namely recognized that not an enlargement of the door provided in the front section and its extending into the roof section results in a better loading capacity, but, rather, a roof covering to be opened independent of the door can be reached with constructively simple measures. The roof covering can, in this procedure, be upward folded, be moved to the front or to the rear and/or to the side, or it may be rolled up, so that, to the top, a loading opening arises, which can be considerably larger than the opening lockable by the door in the front wall. In other words, even if the machine tool is configured for machining very bulky and/or heavy work pieces, there is not an extremely large door necessary, the accessibility is, rather, made possible by the removable part of the roof covering.

It is then preferred if the roof covering comprises at least one bellow, which is movable both with and separated from the headstock.

In this measure, it is advantageous that the opening and the locking of the roof covering is performed in a constructively simple way, namely by moving a bellow. Another object is in this design that the machine tool in its entirety can be constructed with a lower height, since the bellow forming the roof covering can be fastened laterally at the headstock or near to same in such a way that it protrudes partly to the top over the bellow, a housing reaching over the headstock is not necessary.

It is further preferred in this connection if a console is provided, which is movable to-and-fro between the headstock and a first side wall, and that the at least one bellow of the roof covering extends between the console and the headstock, wherein preferably on both sides of the headstock, a console with corresponding bellow as roof covering is provided.

This measure is in particular constructively advantageous, by a simple moving of the console, the working area is opened to the top on the corresponding side of the headstock. If two such consoles exist, the machining side and the loading side can be loaded alternately.

It is here generally preferred if the roof covering comprises a further bellow, which extends between the headstock and the front wall, and which is movable both with and separated from the headstock.

Thus, it is a further object of the invention that the loading opening accessible from above is enlarged in a constructively simple way. This is achieved since the loading opening is here, so-to-speak, enlarged by the regions in front of the headstock, which are covered by the other bellow.

It is further preferred if between the console and the assigned side wall, a first rear bellow, and between console and headstock, a second rear bellow are arranged.

In this measure, it is advantageous that, independently of the position of the console, the working area is always closed to the rear, so that the guidings and aggregates being arranged there are protected against contamination. If during the loading process the console was accordingly moved towards the headstock—maximally, however, only up to the size of the working field to be loaded by crane—, so that the working area is open to the top, the first rear bellow closes the working area to the rear, so that no chips can arrive on the guidings or enter the protected aggregates, when the device is blown off.

During the machining of a work piece, the console is moved outwardly, so that the upper bellow and the second bellow, together with the side wall and the front wall, provide for a sealing of the working area.

It is true that it would also be possible to arrange a bellow each to both sides between the side wall and the headstock and to move the console independently of the respective rear bellow, in this way, however, sealing problems would occur in the area of the contact point between the upper bellow of the roof covering and the rear bellow.

The inventors of the present invention have recognized that, in spite of the at first glance disadvantageous arrangement of two rear bellows, there is yet a great advantage in this design, which is namely the better sealing of the working area in the region of the contact point between the roof covering and the rear wall. If, namely, only one rear bellow was provided, an additional guiding would have to be provided in the region of the contact point, in which, on the one hand, the rear bellow and, on the other hand, the bellow of the roof covering runs, as these are movable independently of each other.

In the selected design with two bellows, however, a better sealing can be provided, whereby it is particularly preferred if the second rear bellow and the assigned bellow are firmly connected with each other, preferably integrally configured with each other.

In this way, a good sealing in the contact area is provided.

It is also generally preferred if the console has a frame with a drive of its own, which frame is guided on guidings behind the working area, whereby the drive preferably comprises a pneumatic cylinder, which further preferably comprises a pneumatic cylinder without piston rods but with a magnetic coupling between the piston and the displaceable outer tube.

In this measure, it is advantageous that a very elegant drive for the console can be realized, which has, essentially, the same dimensions in x-direction as the console is movable, so that hereby the overall width of the new machine tool is not changed.

Further, it is also preferred if the opening in the front wall extends to the top up to the movable part of the roof covering.

In this measure, it is advantageous that the loading opening is accessible on nearly the whole width of the machine tool from the top as well as on the width of the door also from the front, whereby the opening in the front wall and the loading opening overlap each other, so that larger work pieces can also be brought obliquely from the front into the working area.

If the machine tool is configured for alternating machining of work pieces on the machining side and on the loading side, two doors, of course, must be provided, which are alternatively opened either manually or automatically.

Finally, it shall be mentioned that the design with the opening roof covering can also be used when the relative movement between the headstock and the device is performed in that way that a work piece table receiving the device is moved.

Further advantages can be taken from the description and the enclosed drawings.

It is to be understood that the features mentioned above and those yet to be explained below can be used not only in the respective combinations indicated, but also in other combinations or in isolation, without leaving the scope of the present invention.

BRIEF DESCRIPTION OF THE DRAWINGS

An embodiment of the invention is shown in the drawings and will be explained in more detail in the description below. In the drawings:

FIG. 6 shows a top view onto the machine tool from FIG. 1.

DETAILED DESCRIPTION OF A PREFERRED EMBODIMENTS

Figure 1:
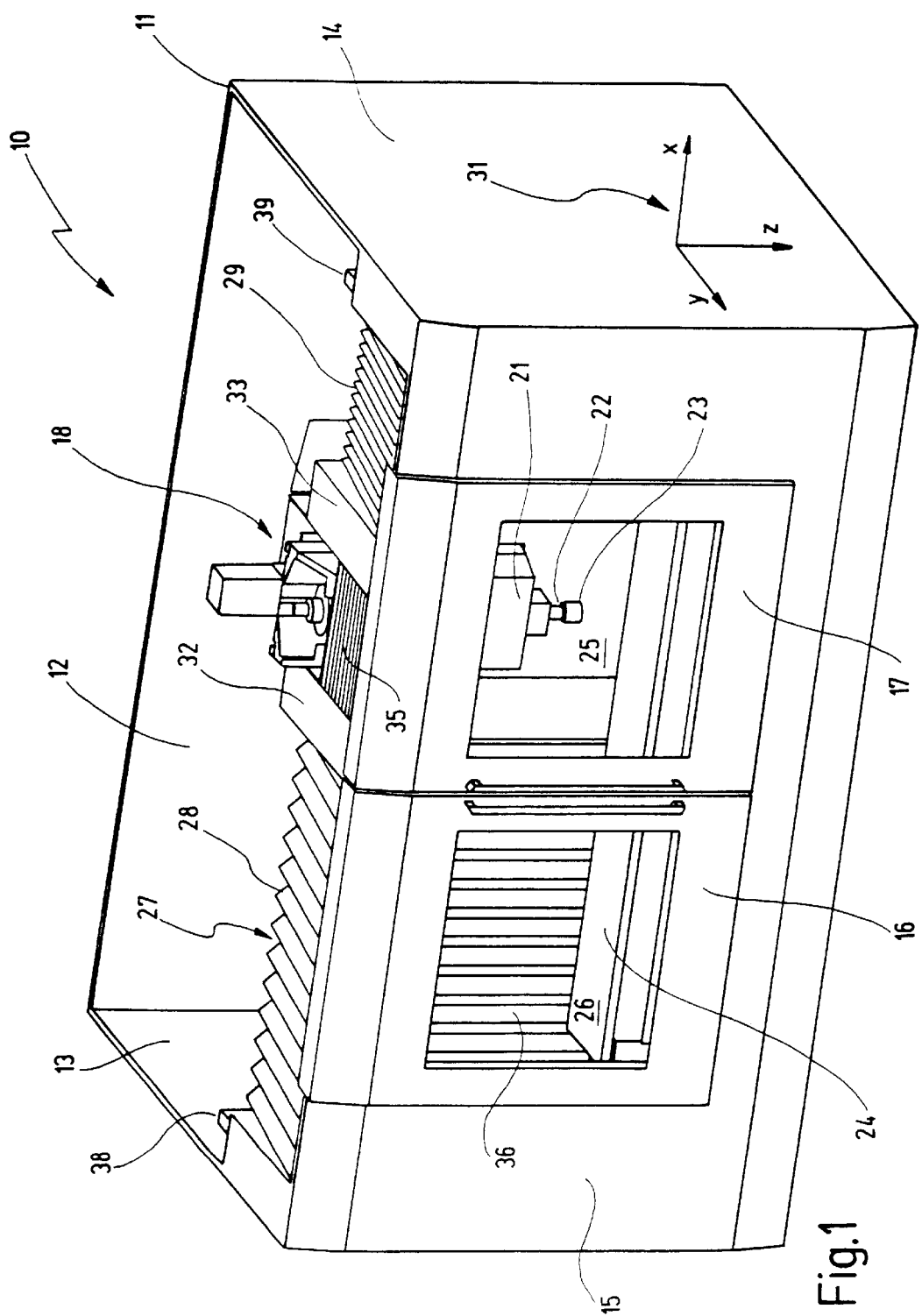
FIG. 1 shows a schematic view of a new machine tool with a sealed working area.

In FIG. 1, a machine tool is designated with 10 and comprises a housing 11 that has a rear wall 12, two side walls 13, 14 and a front wall 15. At front wall 15, two sliding doors 16, 17 are provided, which can be slid to the left or to the right.

In housing 11, a headstock 18 is provided, on which a spindle head 21 with a main spindle 22 is mounted, in which a tool 23 is clamped. Beneath tool 23, a work piece table 24 can be seen, onto which work pieces to be machined can be laid.

Machine tool 10 has a working area which is divided into a right section 25 and into a left section 26. Working area 25, 26 is laterally covered by side walls 13 and 14, to the front by front wall 15 and to the top by a roof covering 27, which has a left upper bellow 28 and a right upper bellow 29.

At the right in FIG. 1, a system of coordinates 31 is shown, which describes relative to work piece table 24 the movement directions of tool 23 with x, y and z. These movements are effected by the fact that spindle head 21 is movable between two cheeks 32, 33 in y-direction as well as in z-direction. In x-direction the whole headstock 18 moves with cheeks 32, 33, whereby bellows 28, 29 are correspondingly lengthened or shortened.

Between the two cheeks 32, 33, another bellow is arranged, which extends between front wall 15 and headstock 18 in y-direction. When spindle head 21 is moved in y-direction, bellow 35 is shortened or lengthened correspondingly.

To the rear, working area 26 is sealed by a bellow indicated at 36, which bellow extends between left side wall 13 and headstock 18, like bellow 28. In the same manner, bellow 29 extends between right side wall 14 and headstock 18. Working area 25 is also covered, to the rear, by another bellow, which extends between headstock 18 and right side wall 14, this bellow, however, cannot be seen in FIG. 1.

Bellow 28 and bellow 36 are fixed in the area of cheek 32 with their right end, while they are fixed at a console merely indicated in 38 with their left end. On the other side of machine tool 10, a corresponding console 39 is provided, on which bellow 29 is fixed with its right end.

Figure 2:
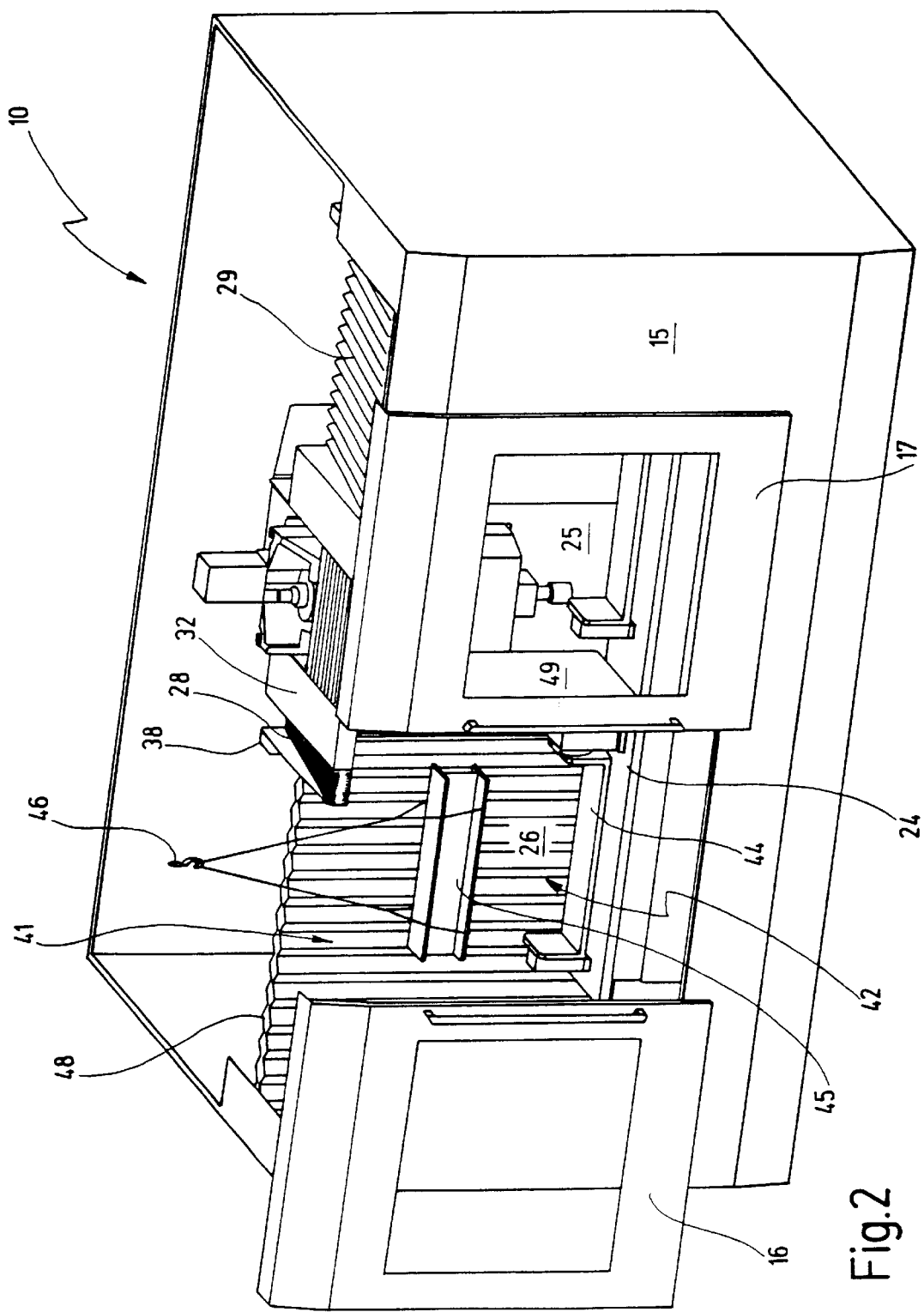
FIG. 2 shows the machine tool from FIG. 1 with opened working area.

While in FIG. 1 both sliding doors 16, 17 are closed, the machine tool from FIG. 1 is shown in FIG. 2 in a state, in which working area 26 is accessible from the outside through a loading opening 41 and through an opening 42 released by door 16.

Loading opening 41 results by moving console 38 with respect to FIG. 1 to the very right, so that bellow 28 and bellow 36 now are tightly folded up and lie adjacent to cheek 32. Depending on the size of the work piece to be loaded, also a less close moving of console 38 towards cheek 32 is possible. In that way, roof covering 27 has been opened so wide, that loading opening 41 results. Opening 42 is created by moving sliding door 16 to the left, so that, altogether, an opening with sufficient size is created, through which a device 44 and/or a work piece 45 can be brought into working area 26 by means of a crane indicated at 46.

In FIG. 2, it is further shown that working area 26 is still covered to the rear, this is now done by a bellow 48, which was folded up between console 38 and left side wall 13 in FIG. 1.

Through the window in sliding door 17, it can also be seen that working area 26 is separated by a partitioning wall 49 from working area 25, so that a work piece can be machineed in working area 25, while, at the same time, a new work piece 45 is loaded into working area 26. In connection with the loading of working area 26, it is necessary to blow off work piece 45 and/or device 44.

Bellow 48 prevents the chips flying around in this proceeding from entering the rear part of the machine tool, where guidings and other devices are provided.

Figure 3:
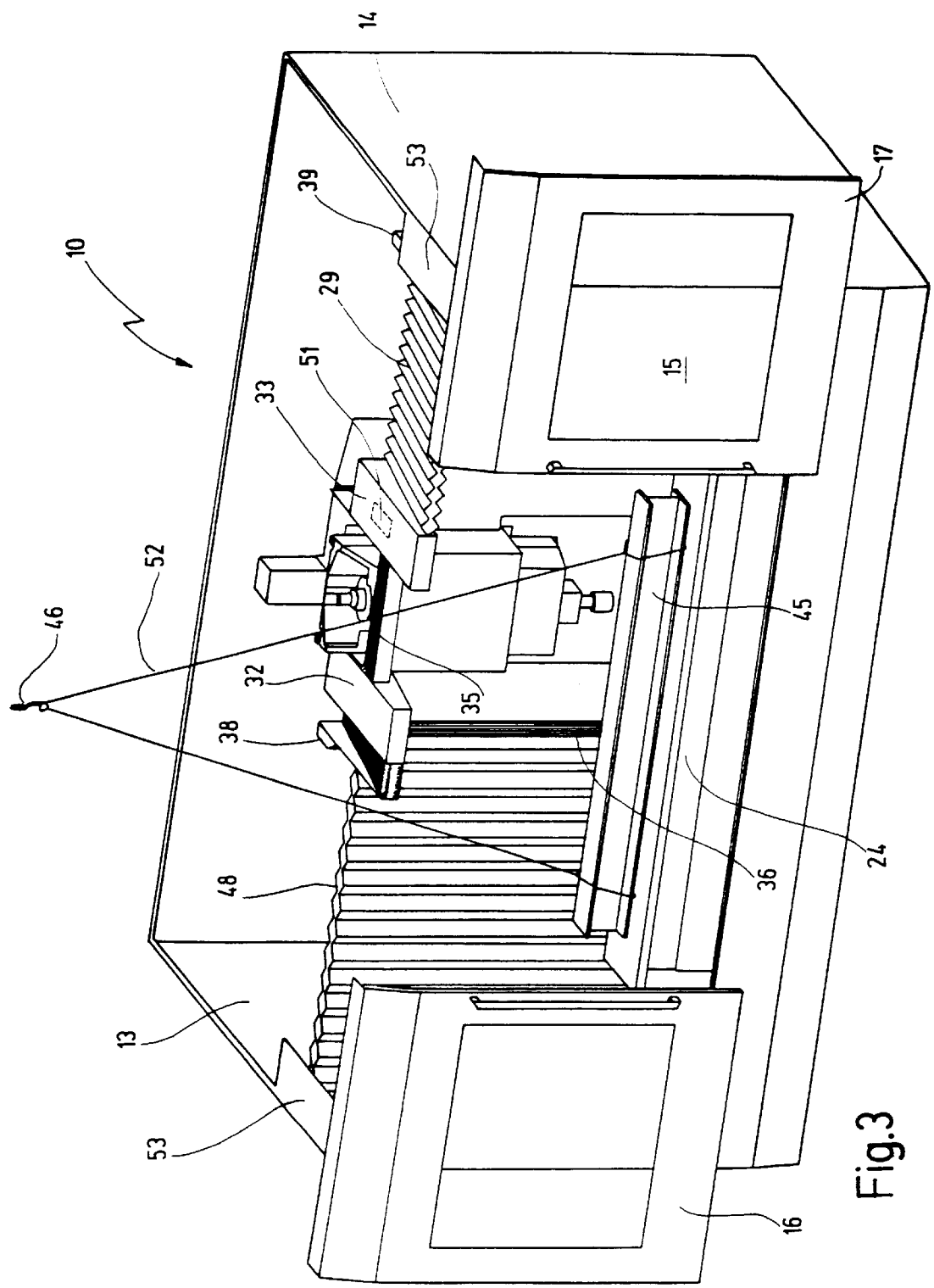
FIG. 3 shows the machine tool in a depiction as FIG. 2, however, with larger loading opening.

If a larger work piece 45 is to be loaded into machine tool 10, also upper bellow 35 can be moved back, which has drive 51 of its own for this purpose, as indicated schematically in FIG. 3. In this way, large areas of working area 25, 26 of machine tool 10 are opened to the top, so that a carrying rope 52 of crane 46 can put a very large work piece 45 into machine tool 10, to this end sliding door 17 in FIG. 3 was moved to the right.

In FIG. 3, it can also be seen that the machine tool has two coverings 53 at its top edge, beneath which coverings console 38 and/or 39 and the corresponding bellow can be moved.

As known per se, each bellow is provided with individual frames on which the corresponding cover material is fixed.

Figure 4:
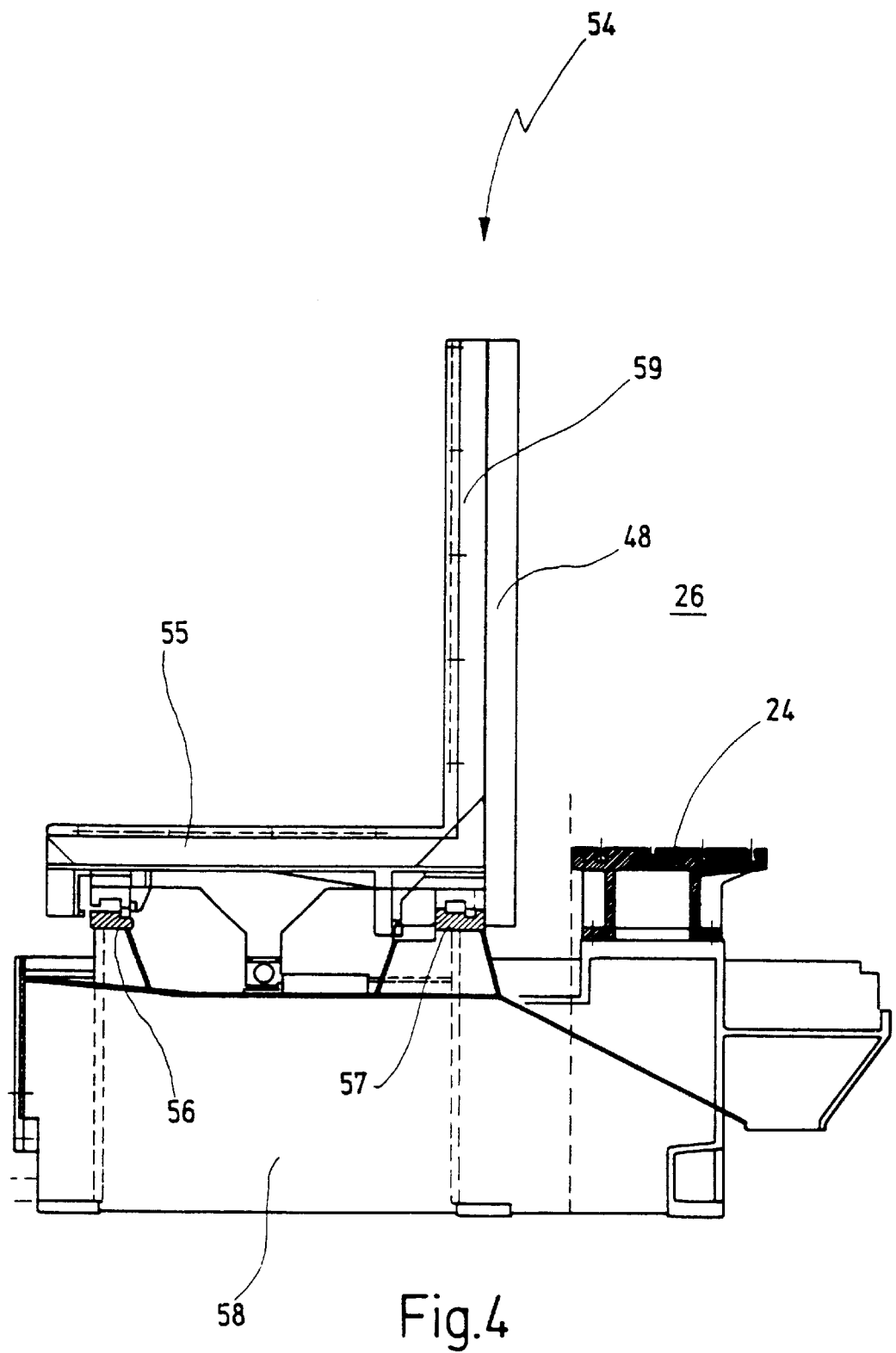
FIG. 4 shows a side view of a frame of a bellow of the machine tool of FIG. 1.

In FIG. 4, such a frame 54 for bellow 48 is shown. Frame 54 has an L-form with a basis part 55 which is mounted, safely against overturning, on guidings 56, 57 of the machine bed. Further, frame 54 has an upright stand 59, on which bellow 48 is fixed. In that way, working area 26 is sealed with respect to guidings 56, 57, so that these cannot be contaminated by chips flying around.

Figure 5:
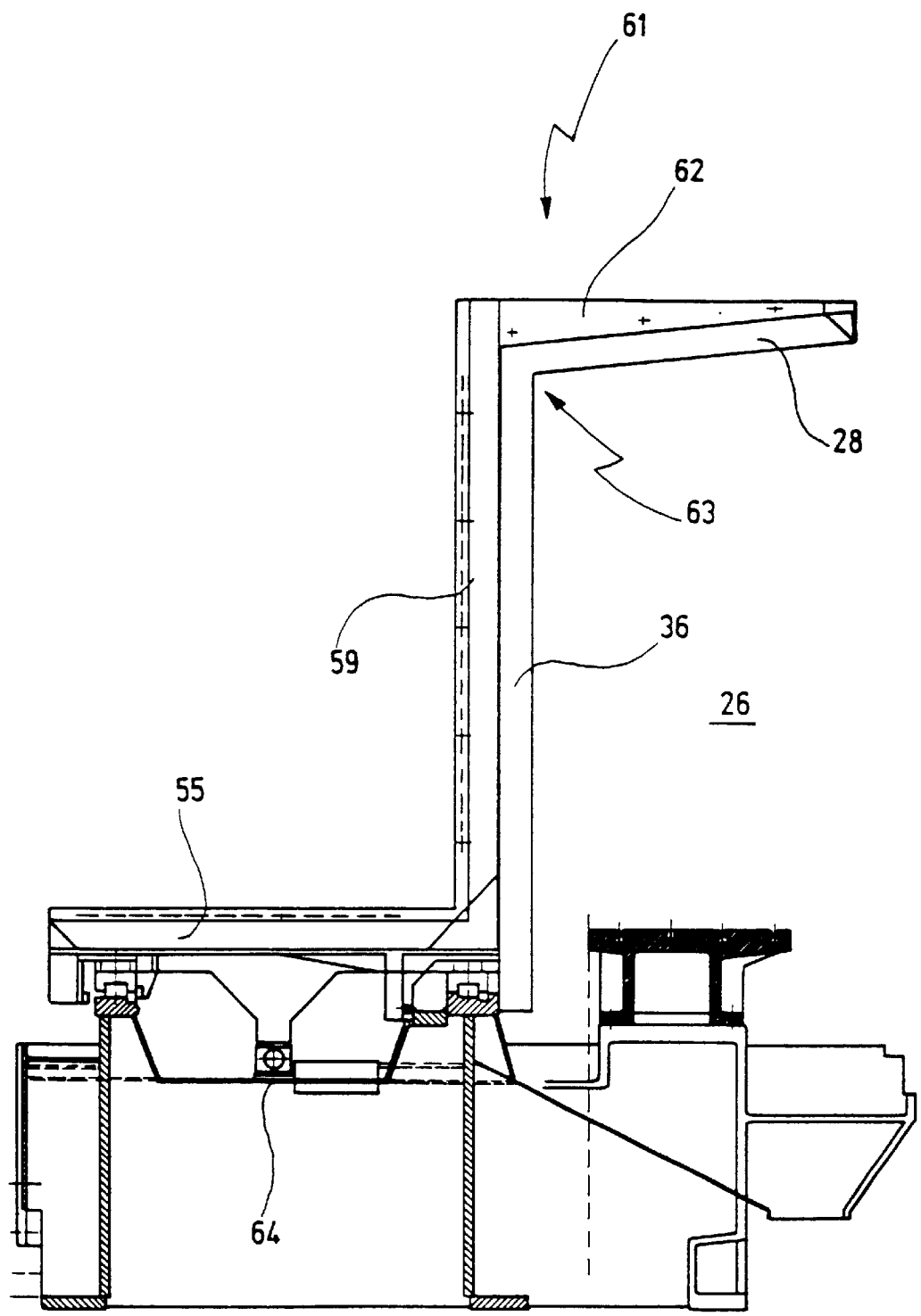
FIG. 5 shows in a depiction like FIG. 4 another frame for a bellow.

In FIG. 5, in a side view like FIG. 4, a frame 61 is depicted, which, additionally to rear bellow 36, carries a bellow 28 of roof covering 27.

Frame 61 has Z-form, additionally to basis part 55 and stand 59, a roof part 62 is provided, which extends opposite to basis part 55 from stand 59. On stand 59, bellow 36 is fixed, while at roof part 52, bellow 28 is fixed. Between the two bellows 28, 36, a contact point 63 is produced, where the two bellows 28, 36 are configured integrally with each other, so that, if console 38 is moved to the left, as shown in FIG. 1, chips arising in working area 26 can neither escape laterally nor to the top nor diagonally to the top.

It should also be mentioned that in FIG. 5 a drive 64 for console 38 is schematically depicted, which can better be recognized in top view of FIG. 6. At guidings 56, 57, consoles 38, 39 are also guided safely against overturning.

In top view of FIG. 6, it is first of all to be recognized that bellow 48 extends between left side wall 13 and console 38, while bellow 28 and 36 are depicted, in compressed form, between console 38 and cheek 32.

In the same way, three bellows are provided on the right side of machine tool 10, namely additionally to bellow 29, which is already known from FIG. 1, also rear bellows 66 and 68 are provided, which are arranged to the left and to the right of console 39.

In FIG. 6, further, schematically, a pneumatic cylinder 71 is arranged for each console 38, 39, in which, respectively, a not depicted piston without a piston rod runs, which piston is connected via a magnetic coupling with an outer tube 72 which is movable by the pneumatic entrainment of the piston between a right and a left position, the latter being shown in dashes in FIG. 6. In this movement of outer tube 72, consoles 38 and 39 are also moved, whereby the bellows correspondingly extend or fold.

In FIG. 6, further, also frames 54 and 61 are indicated, on which the corresponding bellows are fixed.

If console 38 is in its right position in FIG. 6, working area 26 is open to the top and covered to the rear by bellow 48. If console 38 in FIG. 6 is moved to the left, working area 26 is covered to the top by bellow 28 and to the rear by bellow 36.

In a corresponding manner, working area 26 is covered to the top by bellow 29 and to the rear by bellow 66, if console 39 is moved to the right, whereas working area 25 is accessible from the top and is covered to the rear by bellow 68, if console 39 is moved to the left in FIG. 6.

If required, bellow 35 can be moved to the top in FIG. 6, so that the loading opening is correspondingly enlarged.

We claim:

1. A machine tool, comprising a working area, a left side wall, a right side wall, a front wall, a rear wall and a roof covering for closing off said working area, a headstock arranged in said working area and supporting a main spindle, said main spindle being arranged for clamping tools, a device arranged in said working area for clamping work pieces to be machined by said tools, wherein said headstock is movable relative to said device, wherein said roof covering comprises a first bellow which is movable both with and separated from said headstock between two positions in such a way that in a first position it closes said working area to the top and in a second position it opens the working area to the top, wherein a first console having a drive of its own is provided, which first console is movable to-and-fro between the headstock and a first of said left and right side walls, and wherein the first bellow is fixed to and extends between the first console and the headstock.

2. A machine tool as in claim 1, wherein a second console is provided, which is movable to-and-fro between said headstock and a second of said left and right side walls, and wherein said roof covering comprises a second bellow extending between the second console and the headstock.

3. A machine tool as in claim 1, wherein the roof covering comprises a further bellow, which extends between the headstock and said front wall, and which is movable both with and separated from said headstock.

4. A machine tool as in claim 1, wherein between the first console and the first side wall, a first rear bellow, and between the first console and the headstock, a second rear bellow are arranged.

5. A machine tool as in claim 2, wherein between the second console and the second side wall, a third rear bellow, and between the second console and the headstock, a fourth rear bellow are arranged.

6. A machine tool as in claim 4, wherein said second rear bellow and the first bellow of the roof covering are firmly connected to each other.

7. A machine tool as in claim 5, wherein said fourth rear bellow and the second bellow of the roof covering are firmly connected to each other.

8. A machine tool as in claim 2, wherein the second console is guided behind the working area on guidings and has a drive of its own.

9. A machine tool as in claim 1, wherein said drive comprises a pneumatic cylinder having a piston, a movable outer tube and a magnetic coupling between piston and movable outer tube.

10. A machine tool as in claim 8, wherein said drive comprises a pneumatic cylinder having a piston, a movable outer tube and a magnetic coupling between piston and movable outer tube.

11. A machine took as in claim 1, further comprising a door opening provided in said front wall and leading into the working area, a door being provided for closing said door opening, wherein the opening in the front wall extends to the top up to the first bellow.

12. A machine tool, comprising a working area, a left side wall, a right side wall, a front wall, a rear wall and a roof covering for closing off said working area, a headstock arranged in said working area and supporting a main spindle, said main spindle being arranged for clamping tools, a device arranged in said working area for clamping work pieces to be machined by said tools, wherein said headstock is movable relative to said device, wherein said roof covering comprises at least one bellow, which is movable both with and separated from said headstock and which bellow is movable between two positions in such a way that in a first position it closes said working area to the top and in a second position it opens the working area to the top, and wherein a console is provided, which is movable to-and-fro between the headstock and a first of said left and second side walls, and wherein the at least one bellow of said roof covering extends between the console and the headstock.

13. A machine tool as in claim 6, wherein the second rear bellow and the first bellow are configured integrally with each other.

14. A machine tool as in claim 7, wherein said fourth rear bellow and the second bellow are configured integrally with each other.

15. A machine tool as in claim 9, wherein said pneumatic cylinder is without piston rods.

16. A machine tool as in claim 10, wherein said pneumatic cylinder is without piston rods.

17. A machine tool, comprising a working area, a left side wall, a right side wall, a front wall, a rear wall and a roof covering for closing off said working area, a headstock arranged in said working area and supporting a main spindle, said main spindle being arranged for clamping tools, a device arranged in said working area for clamping work pieces to be machined by said tools, wherein said headstock is movable relative to said device, wherein at least one part of said roof covering is movable between two positions in such a way that in a first position it closes said working area to the top and in a second position it opens the working area to the top, wherein said roof covering comprises a first bellow, which is movable both with and separated from said headstock, wherein a first console is provided, which is movable to-and-fro between the headstock and a first of said left and right side walls, and wherein the first bellow of said roof covering extends between the first console and the headstock, and wherein between the first console and the first side wall, a first rear bellow, and between the first console and the headstock, a second rear bellow are arranged.

* * * * *

UNITED STATES PATENT AND TRADEMARK OFFICE
CERTIFICATE OF CORRECTION

PATENT NO. : 6,749,495 B2
DATED : June 15, 2004
INVENTOR(S) : Grund et al.

It is certified that error appears in the above-identified patent and that said Letters Patent is hereby corrected as shown below:

Title page,
Item [30], Foreign Application Priority Data, "199 56 900" should read
-- 199 56 900.2 --.

Signed and Sealed this

Twenty-eighth Day of June, 2005

JON W. DUDAS
*Director of the United States Patent and Trademark Office*